(12) United States Patent
Yanase

(10) Patent No.: US 11,128,768 B2
(45) Date of Patent: Sep. 21, 2021

(54) INFORMATION PROCESSING APPARATUS, HOME SCREEN DISPLAY METHOD, AND HOME SCREEN DISPLAY PROGRAM

(71) Applicant: Masatoshi Yanase, Kanagawa (JP)

(72) Inventor: Masatoshi Yanase, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/951,271

(22) Filed: Nov. 18, 2020

(65) Prior Publication Data

US 2021/0168248 A1 Jun. 3, 2021

(30) Foreign Application Priority Data

Nov. 29, 2019 (JP) .............................. JP2019-217167

(51) Int. Cl.
*H04N 1/00* (2006.01)
(52) U.S. Cl.
CPC ..... *H04N 1/00413* (2013.01); *H04N 1/00506* (2013.01); *H04N 2201/0094* (2013.01)

(58) Field of Classification Search
CPC ........... H04N 1/00413; H04N 1/00506; H04N 2201/0094
See application file for complete search history.

(56) References Cited

U.S. PATENT DOCUMENTS

| 9,253,339 | B2 | 2/2016 | Shibukawa et al. |
| 9,778,837 | B2* | 10/2017 | Shepherd ............... G06F 21/629 |
| 2017/0336913 | A1* | 11/2017 | Yoo ........................ G06F 1/1647 |
| 2018/0081529 | A1* | 3/2018 | Zhang ............... H04M 1/72436 |
| 2019/0286432 | A1 | 9/2019 | Yanase |

FOREIGN PATENT DOCUMENTS

JP 2014-154098 8/2014

* cited by examiner

*Primary Examiner* — Neil R McLean
(74) *Attorney, Agent, or Firm* — IPUSA, PLLC

(57) ABSTRACT

An information processing apparatus includes a memory; and a processor configured to execute a hiding process of hiding a page on which no icon is to be displayed at all from among a plurality of pages included in a home screen on which a plurality of icons of applications installed on the information processing apparatus are arranged, and a displaying process of displaying the home screen to which the hiding process is applied.

7 Claims, 7 Drawing Sheets

FIG.5

| NO. | NAME OF APPLICATION | INSTALLATION STATE | AUTHENTICATION STATE |
|---|---|---|---|
| 1 | COPIER | INSTALLED | AVAILABLE |
| 2 | SCANNER | NOT INSTALLED | — |
| 3 | FAX | NOT INSTALLED | — |
| 4 | PRINTER | INSTALLED | NOT AVAILABLE |
| ... | ... | ... | ... |

INFORMATION PROCESSING APPARATUS, HOME SCREEN DISPLAY METHOD, AND HOME SCREEN DISPLAY PROGRAM

CROSS-REFERENCE TO RELATED APPLICATIONS

The present application claims priority under 35 U.S.C. § 119 of Japanese Patent Application No. 2019-217167 filed on Nov. 29, 2019, the entire contents of which are hereby incorporated by reference.

BACKGROUND OF THE INVENTION

1. Field of the Invention

The present disclosure relates to an information processing apparatus, a home screen display method, and a home screen display program.

2. Description of the Related Art

On an information processing apparatus such as an MFP (Multifunction Peripheral/Printer/Product), icons of applications installed on the device are displayed on an operation screen of the device.

Patent document 1 discloses a configuration in which available applications are determined based on the authentication information on the applications, to display icons of the available applications on the home screen, and to hide icons of the other applications.

However, when a user is not logged in, it is often the case no use permission is given with respect to the applications, and in the case where there is no available application, there may be a case where no icon is displayed on the home screen at all. In the case where no icon is displayed on the home screen, the user may erroneously recognize that an error occurs even if no error has actually occurred, and make unnecessary inquiries to the service personnel or the administrator.

RELATED ART DOCUMENTS

[Patent Documents]

Patent document 1: Japanese Laid-Open Patent Application No. 2014-154098

SUMMARY OF THE INVENTION

According to one aspect in the present disclosure, an information processing apparatus includes a memory; and a processor configured to execute a hiding process of hiding a page on which no icon is to be displayed at all from among a plurality of pages included in a home screen on which a plurality of icons of applications installed on the information processing apparatus are arranged, and a displaying process of displaying the home screen to which the hiding process is applied.

BRIEF DESCRIPTION OF DRAWINGS

Other objects and further features of embodiments will be apparent from the following detailed description when read in conjunction with the accompanying drawings, in which:

FIG. 5 is a diagram illustrating an example of information stored in a device state holding unit;

DETAILED DESCRIPTION OF THE EMBODIMENTS

Figure 1:
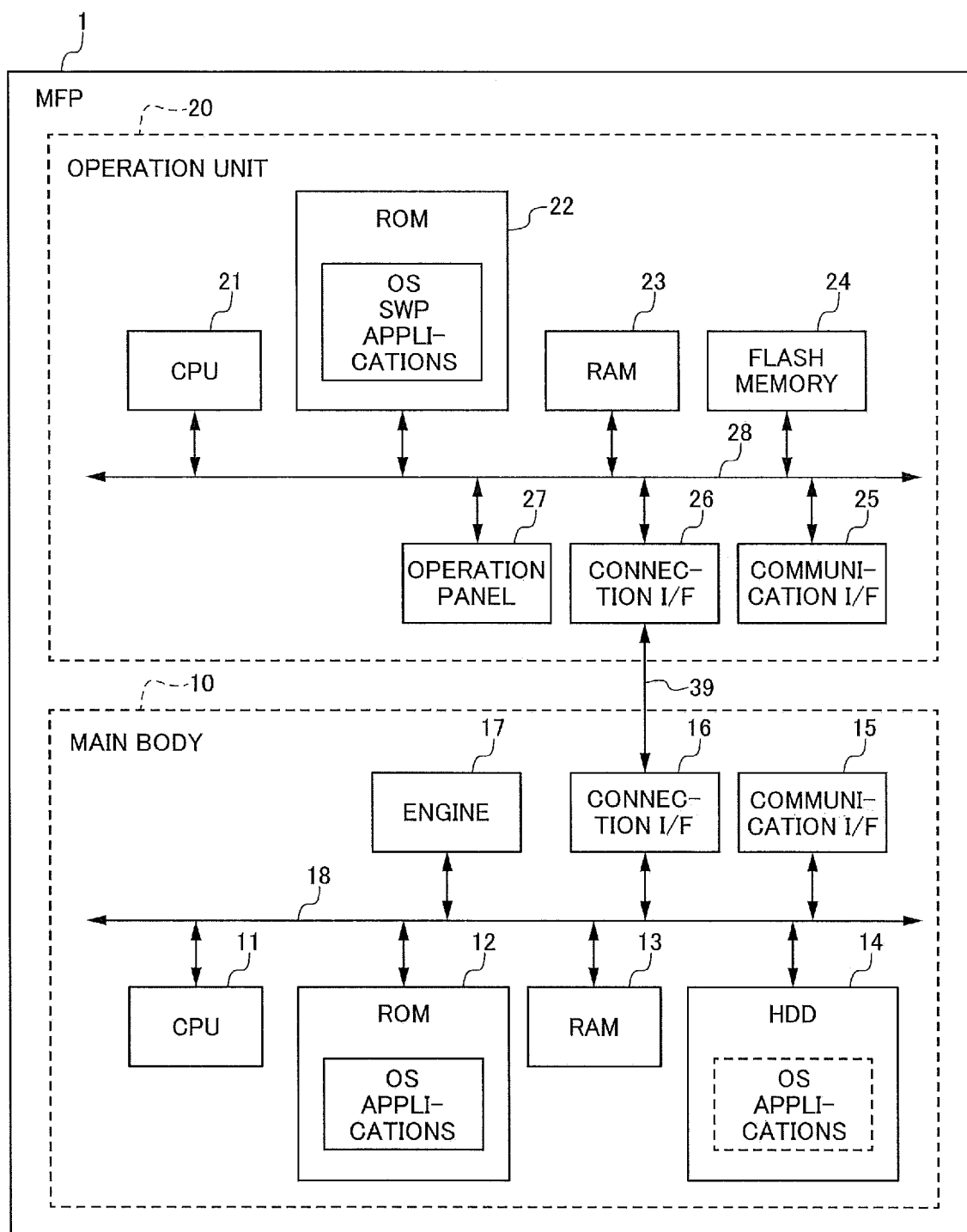
FIG. 1 is a diagram illustrating a hardware configuration of an information processing apparatus according to an embodiment.

In the following, an embodiment will be described with reference to the accompanying drawings. In order to facilitate understanding of the description, the same components throughout the drawings are designated by the same reference numerals as long as possible, to omit duplicate descriptions.

According to at least an embodiment in the present disclosure, an information processing apparatus is provided to be capable of avoiding a situation where no icon is displayed on the home screen of the information processing apparatus, which improves the user operability.

<Hardware Configuration>

FIG. 1 is a diagram illustrating a hardware configuration of an information processing 1 apparatus according to an embodiment.

The information processing apparatus 1 is a device having image processing functions and communication functions of, for example, a so-called MFP that may include functions of a fax, a scanner, a copier, a printer, and the like. As illustrated in FIG. 1, the information processing apparatus 1 is a stand-alone device constituted with a main body 10 and an operation unit 20.

The main body 10 is a component that implements functions such as the image processing functions and the communication functions described above. The operation unit 20 receives input in response to an operation performed by the operator. The main body 10 and the operation unit 20 are connected to each other via a dedicated communication channel 39, which may be compliant with, for example, the USB standard, or may be compliant with any other standard of wired or wireless communication.

The main body 10 includes a CPU 11, a ROM 12, a RAM 13, a HDD 14, a communication interface (I/F) 15, a connection I/F 16, and an engine 17, which are connected with each other via a system bus 18.

The CPU 11 controls operations of the main body 10 as a whole. The CPU 11 executes a program stored in the ROM 12 or the HDD 14 by using the RAM 13 as a work area, to control operations of the entire main body 10 so as to implement various functions of the copier functions, scanner functions, fax functions, printer functions, and the like described above.

The engine 17 is a hardware to implement the copier functions, scanner functions, fax functions, printer functions, and the like, other than general-purpose information processing and communication.

In response to an occurrence of an event that generates a log, the main body 10 stores the log in a log information accumulation device in the device. The log information accumulation device is typically an HDD 14, and in the case where the HDD 14 is not included, the RAM 13 can be used.

The operation unit 20 includes a CPU 21, a ROM 22, a RAM 23, a flash memory 24, a communication I/F 25, a connection I/F 26, and an operation panel 27, which are connected with each other via a system bus 28.

The operation panel 27 is a so-called touch panel formed integrally with a touch detector formed by transparent electrodes and a liquid crystal display unit. The operation panel 27 receives various inputs through touch operations performed by the operator, and displays various items of information (e.g., information corresponding to an received input, information indicating the operation state of the MFP (information processing apparatus 1), information indicating the setting state, and the like).

<Software Configuration>

Figure 2:
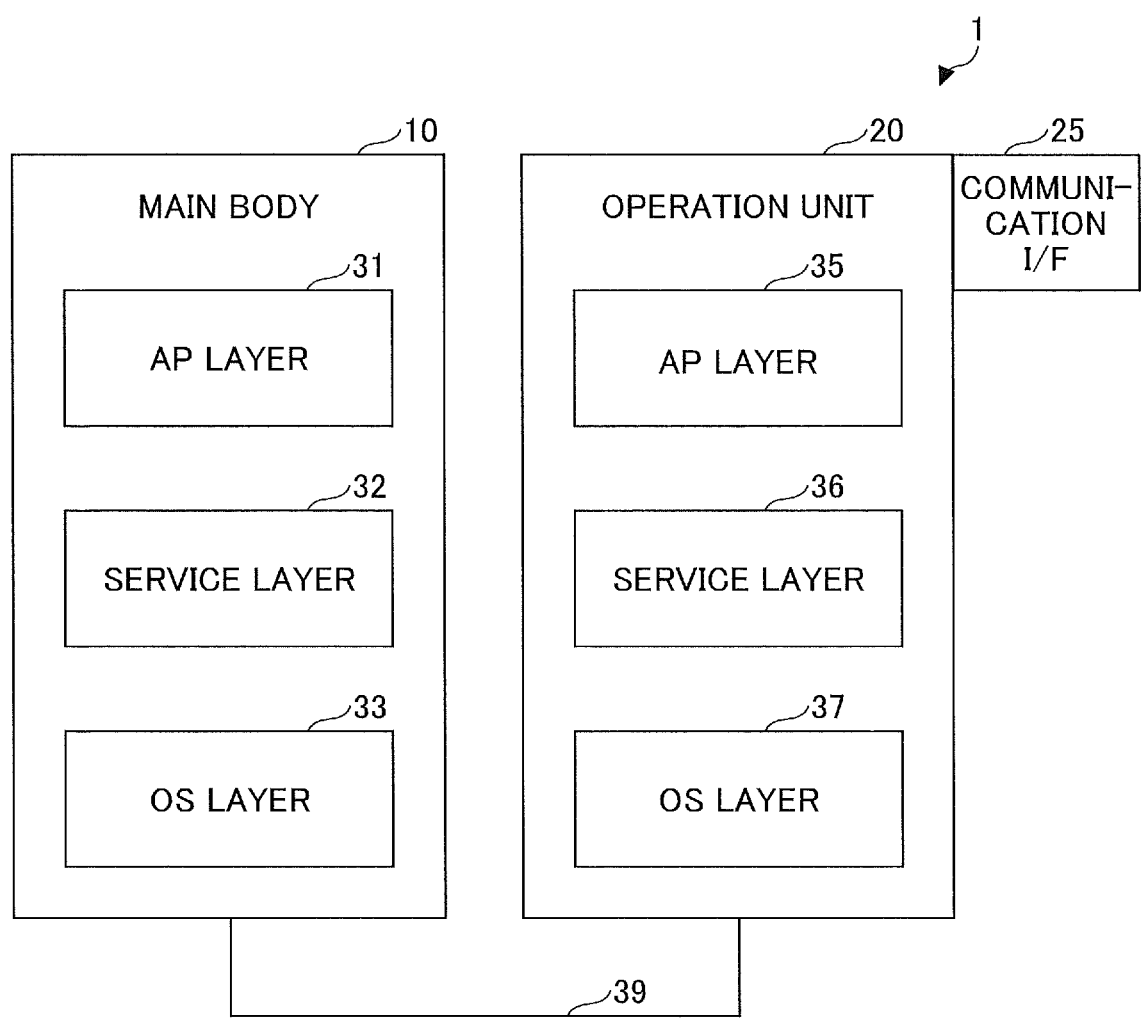
FIG. 2 is a diagram illustrating an example of a software configuration of an information processing apparatus according to an embodiment.

FIG. 2 is a diagram illustrating an example of a software configuration of the information processing apparatus 1 according to the embodiment.

As illustrated in FIG. 2, the main body 10 includes an application layer 31, a service layer 32, and an OS layer 33. The implementation forms of the application layer 31, the service layer 32, and the OS layer 33 are various software components stored in the ROM 12 (or the HDD 14). The CPU 11 executes these software components to provide the various functions.

The operation unit 20 includes an application layer 35, a service layer 36, and an OS layer 37. The application layer 35, the service layer 36, and the OS layer 37 provided on the operation unit 20 are substantially the same as those on the main body 10 in terms of the hierarchical structure. Note that functions provided by applications on the application layer 35 and the types of operation requests that can be received by the service layer 36 are different from those on the main body 10. The applications on the application layer 35 may be software for operating the hardware resources provided on the operation unit 20 to provide predetermined functions, which primarily include software for providing user interface functions for operations related to the functions provided on the main body 10 (the copier functions, scanner functions, fax functions, and printer functions) and for displaying.

<Functional Configuration>

Figure 3:
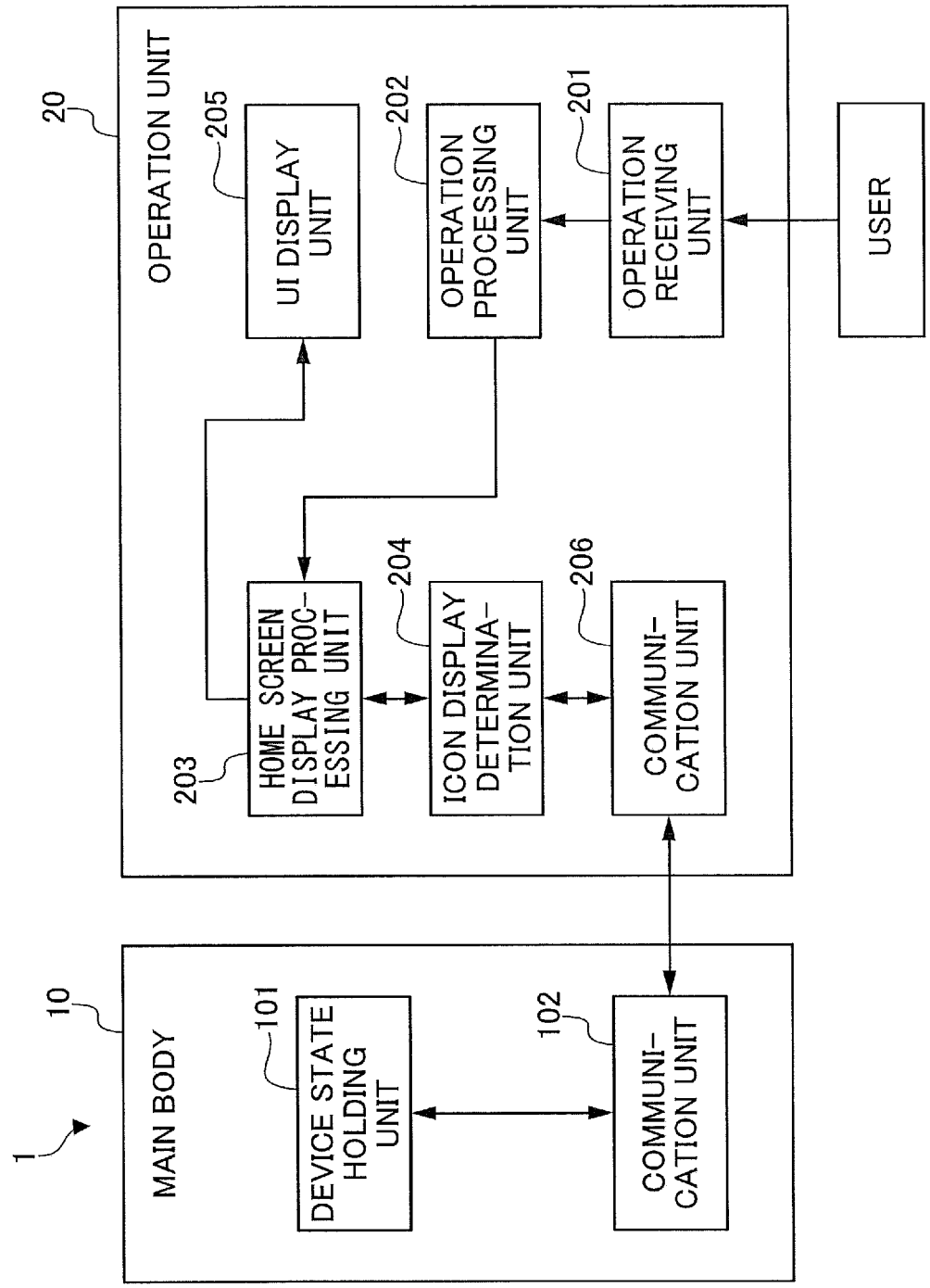
FIG. 3 is a functional block diagram of an information processing apparatus according to an embodiment.

FIG. 3 is a functional block diagram of the information processing apparatus 1 according to the embodiment.

As illustrated in FIG. 3, the main body 10 includes a device state holding unit 101 and a communication unit 102. The operation unit 20 includes an operation receiving unit 201, an operation processing unit 202, a home screen display processing unit 203, an icon display determination unit 204, a user interface display unit 205 (display unit), and a communication unit 206.

The device state holding unit 101 of the main body 10 holds information on applications (such as a copier and a scanner) that are currently available on the device, and authentication information (e.g., which applications are available to a user).

The communication unit 102 transmits and receives information from and to the operation unit 20.

The operation receiving unit 201 of the operation unit 20 receives a user operation and transmits information on the operation to the operation processing unit 202. The operation receiving unit 201 can detect, for example, a touch operation performed by the user on the operation panel 27, to receive a user operation.

The operation processing unit 202 executes necessary processing in response to a user operation. For example, in the case where the user presses a home button, information on the press operation is transmitted to the home screen display processing unit 203.

The home screen display processing unit 203 executes a display process on the home screen. Here, the "home screen" used in the present embodiment is a screen on which icons of applications installed on the information processing apparatus 1 are arranged, which is displayed on the operation panel 27, for example, as the default screen. By touching an icon on the home screen to input a selection operation, the user of the information processing apparatus 1 can use an application corresponding to the icon. The home screen display processing unit 203 executes processes of displaying the arranged icons; hiding the icons based on information transmitted from the icon display determination unit 204; hiding unnecessary pages; and the like.

The icon display determination unit 204 obtains information on applications and functions that are currently available in the authentication state on the device, from the device state holding unit 101 of the main body 10, to determine icons to be hidden.

The user interface display unit 205 displays the home screen set by the home screen display processing unit 203, on the operation panel 27.

The communication unit 206 transmits and receives information from and to the main body 10.

Each function of the operation unit 20 of the information processing apparatus 1 illustrated in FIG. 3 is implemented by loading predetermined computer software (home screen display program) on the hardware including the CPU 21 and the RAM 23 of the operation unit 20, to operate various hardware component under control of the CPU 21, and by reading and writing data in the RAM 23 and the flash memory 24. Also, each function of the device state holding unit 101 and the communication unit 102 of the main body 10 is implemented by loading predetermined computer software (home screen display program) on the hardware including the CPU 11 and the RAM 13 of the main body 10, to operate various hardware component under control of the CPU 11, and by reading and writing data in the RAM 13 and the HDD 14. In other words, by running the home screen display program of the information processing apparatus 1 of the present embodiment on a computer, the operation unit 20 of the information processing apparatus 1 functions as the operation receiving unit 201, the operation processing unit 202, the home screen display processing unit 203, the icon display determination unit 204, the user interface display unit 205, and the communication unit 206 in FIG. 3, and the main body 10 of the information processing apparatus 1 functions as the device state holding unit 101 and the communication unit 102.

<Home screen processing>

Figure 4:
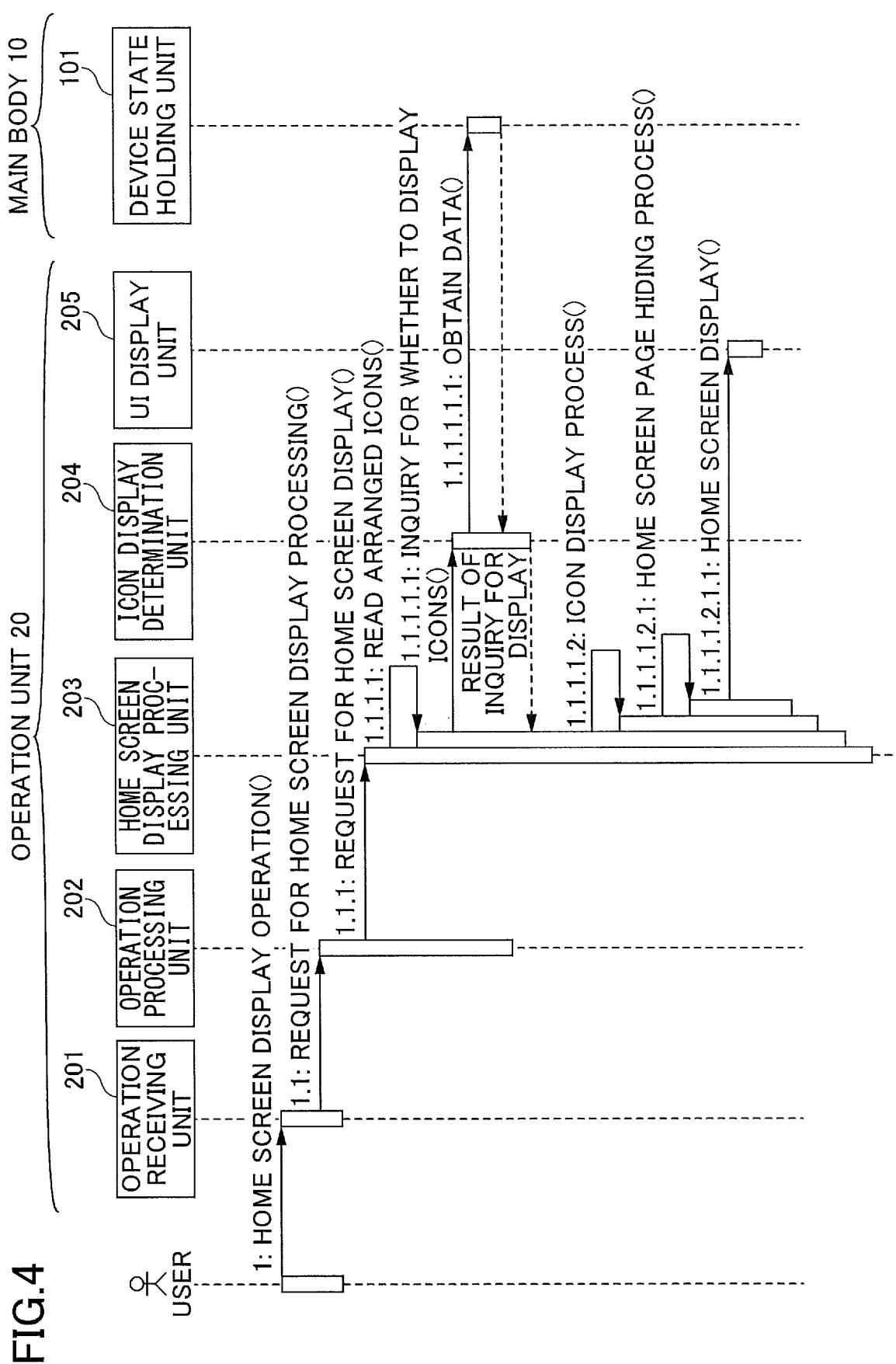
FIG. 4 is a sequence chart illustrating a process of hiding unnecessary pages on the home screen.

With reference to FIG. 4, processing (home screen display method) applied to the home screen based on the presence or absence of an icon to be displayed, will be described. FIG. 4 is a sequence chart illustrating a process of hiding unnecessary pages on the home screen.

At Step 1, first, the user presses the home key on the operation panel 27 to start a home screen display process.

At Step 1.1, the operation receiving unit 201 of the operation unit 20 detects the home screen display operation performed by the user, and transmits the request for the home screen display process to the operation processing unit 202.

At Step 1.1.1, in response to receiving the request for the home screen display process, the operation processing unit 202 transmits the request to the home screen display processing unit 203.

At Step 1.1.1.1, in response to receiving the request for the home screen display process, the home screen display processing unit 203 first reads information on icons that have been already arranged on the home screen and stored.

At Step 1.1.1.1.1, based on the information on the icons read at Step 1.1.1.1, the home screen display processing unit 203 makes an inquiry to the icon display determination unit 204 whether the icons are to be displayed.

At Step 1.1.1.1.1.1, the icon display determination unit 204 obtains a list of applications that are currently available on the device, and a list of applications that are currently available in the authentication state, from the device state holding unit 101 of the main body 10. Based on the obtained information, the icon display determination unit 204 determines whether to display or hide the icons, and returns the result to the home screen display processing unit 203.

At Step 1.1.1.1.2, based on the information on whether to display or hide the icons, the home screen display processing unit 203 set each icon read at Step 1.1.1.1, as an icon to be displayed or to be hidden.

At Step 1.1.1.1.2.1, having determined to display or hide each icon, if there is a page having no icon to be displayed among multiple pages of the home screen, the home screen display processing unit 203 determines that the page is not required, and executes a process of hiding the page (step of hiding a page of the home screen).

At Step 1.1.1.1.2.1.1, having finally determined to display or hide each page, the home screen display processing unit 203 sends a request for drawing a screen to the user interface display unit 205, and the home screen is displayed on the operation panel 27 of the operation unit 20 (displaying step).

FIG. 5 is a diagram illustrating an example of information stored in the device state holding unit 101. This figure illustrates an example of information held in the device state holding unit 101, which indicates applications available on the device, and applications available in the authentication state.

Information on installation varies depending on the types of models of copiers, scanners, and the like. and on the state of the device; therefore, the icon display determination unit 204 determines the icons to be displayed based on this information.

In the example in FIG. 5, the copier functions and the printer functions are installed on the main body 10, and the copier functions are in an available state and the printer functions are in a not-available state. In the case of this example, the icon display determination unit 204 of the operation unit 20 determines only the copier functions as an available application, and the home screen display processing unit 203 displays only the icon representing the copier functions on the home screen.

Figure 6A:
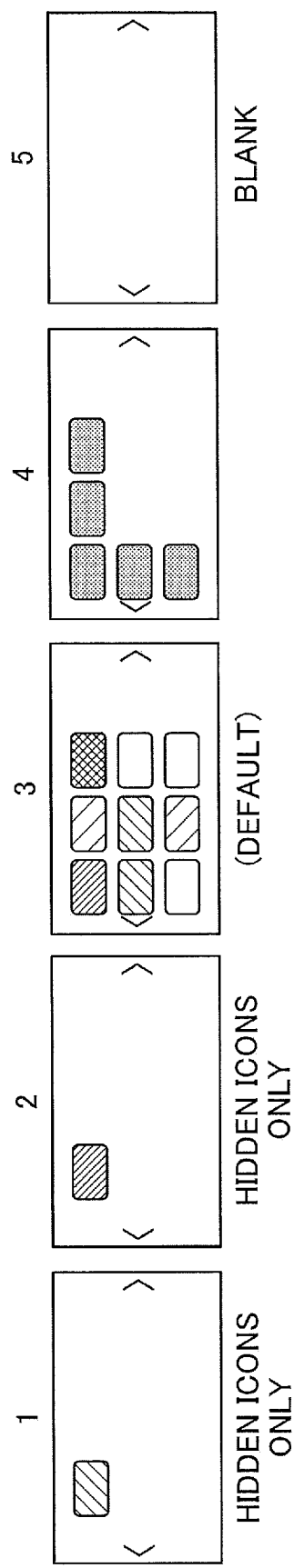
FIGS. 6A-6B are diagram illustrating an example of a process of hiding a home screen page.
Figure 6B:
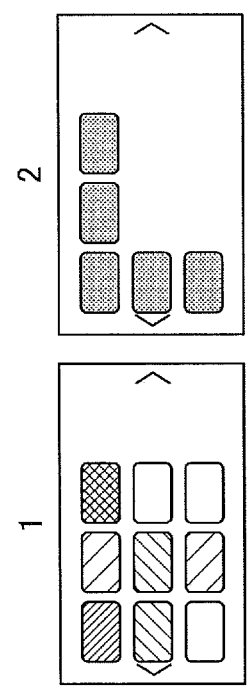

FIGS. 6A-6B are diagrams illustrating an example of a process of hiding a home screen page, executed at Step 1.1.1.1.2.1. In the example in FIGS. 6A-6B, as illustrated in FIG. 6A, five pages are set in advance as the home screen, and application icons are arranged on the pages. One icon is arranged on each of pages 1 and 2, nine icons are arranged on page 3, and five icons are arranged on page 4. Page 5 is a blank page having no icon arranged.

Here, at Step 1.1.1.1.1.1, if the icon display determination unit 204 determines that two icons arranged as the single icon on pages 1 and 2 are icons to be hidden, then at Step 1.1.1.1.2.1, pages 1 and 2 are determined as pages to be hidden. Also, page 5 being a blank page is also determined as a page to be hidden.

Consequently, at Step 1.1.1.1.2.1.1, as illustrated in FIG. 6B, only pages 3 and 4, which are determined as pages to be displayed, are displayed on the operation panel 27 of the operation unit 20 as the home screen. Note that in this mode of displaying, it is possible to set the icons to be movable only to the pages 3 and 4, on which there are icons to be displayed. Also, a blank page is also displayed when adding or moving an icon.

In this way, the information processing apparatus 1 according to the present embodiment includes the home screen display processing unit 203 to execute a process of hiding a page on which no icon is displayed among multiple pages included in the home screen on which icons of applications installed on the information processing apparatus 1 are arranged; and the user interface display unit 205 to display a home screen to which the hiding process has been applied by the home screen display processing unit 203 on the operation panel 27.

Conventionally, in the case where there is no available application, there may be a case where no icon is displayed on the home screen at all. In this case, the user may erroneously recognize that an error occurs even if no error has actually occurred, and make unnecessary inquiries to the service personnel or the administrator. In contrast, in the present embodiment, a page having no icon to be displayed is automatically hidden according to the configuration described above; therefore, it is possible avoid a situation in which no icon is displayed on the home screen of the information processing apparatus 1. This makes it possible to avoid erroneous recognition and unnecessary queries by the user, and thereby, to improve the operability for the user.

Also, the information processing apparatus 1 according to the present embodiment includes the icon display determination unit 204 to hide an icon of an application that is not available, based on the state and the authenticated permission of the application. The home screen display processing unit 203 hides a page on which only an icon to be hidden as determined by the icon display determination unit 204 is arranged, among multiple pages.

This configuration makes it possible to dynamically and precisely determine an icon and/or a page to be hidden, depending on the individual states of various applications installed on the information processing apparatus 1; therefore, it is possible to more securely avoid a situation in which no icon is displayed on the home screen of the information processing apparatus 1.

Also, in the information processing apparatus 1 according to the present embodiment, when an icon is to be moved on the home screen, it is favorable that the home screen display processing unit 203 displays a hidden page so that an icon can be arranged onto the page. This feature can increase the degree of freedom of an arrangement operation of icons, and can improve the operability.

Also, in the information processing apparatus 1 according to the present embodiment, in the case where there is a page on which no icon is displayed among multiple pages, it is favorable that the home screen display processing unit 203 removes the page among the multiple pages, and reorders the other pages having icons to display the other pages. For example, in the example in FIGS. 6A-6B, in the case where pages 1, 2, and 5 are determined as pages to be hidden among the original five pages of the home screen, the pages numbered 3 and 4 to be displayed are reordered to be displayed as pages 1 and 2. This can avoid discomfort that would be felt by the user when the pages are displayed on the home screen, and can make the pages more easier to handle by the user.

Also, in the information processing apparatus 1 according to the present embodiment, it may be also favorable that the home screen display processing unit 203 adjusts the brightness of an icon of an application that is not available due to the state and the authenticated permission of the application to be half, to display a page on which the icon is arranged. In this way, information on an application that is not available can also be presented to the user, which improves the convenience of the user.

Each function of the embodiment described above can be implemented by one or more processing circuits. Here, in the present description, a "processing circuit" includes devices such as a processor programmed to execute each function by software, such as a processor implemented as an electronic circuit, an ASIC (Application Specific Integrated Circuit) designed to execute each function as described above, a DSP (Digital Signal Processor), an FPGA (field programmable gate array), a conventional circuit module, and the like.

Note that in the above embodiment, although an MFP is exemplified as the information processing apparatus 1 according to the embodiment, the information processing apparatus 1 is not limited to an MFP as long as being a device that has a display function on the home screen on which icons of applications are arranged. The information processing apparatus 1 may be, for example, a PJ (Projector), an IWB (Interactive White Board, which is an electronic white board having functions of a white board and being capable of bidirectional communication), an output device such as a digital signage, an HUD (Head Up Display) device, an industrial machine, an imaging device, a sound collecting device, a medical device, a network home appliance, an automobile (connected car), a note PC (Personal Computer), a mobile phone, a smartphone, a tablet terminal, a game machine, a PDA (Personal Digital Assistant), a digital camera, a wearable PC, a desktop PC, or the like.

Figure 7:
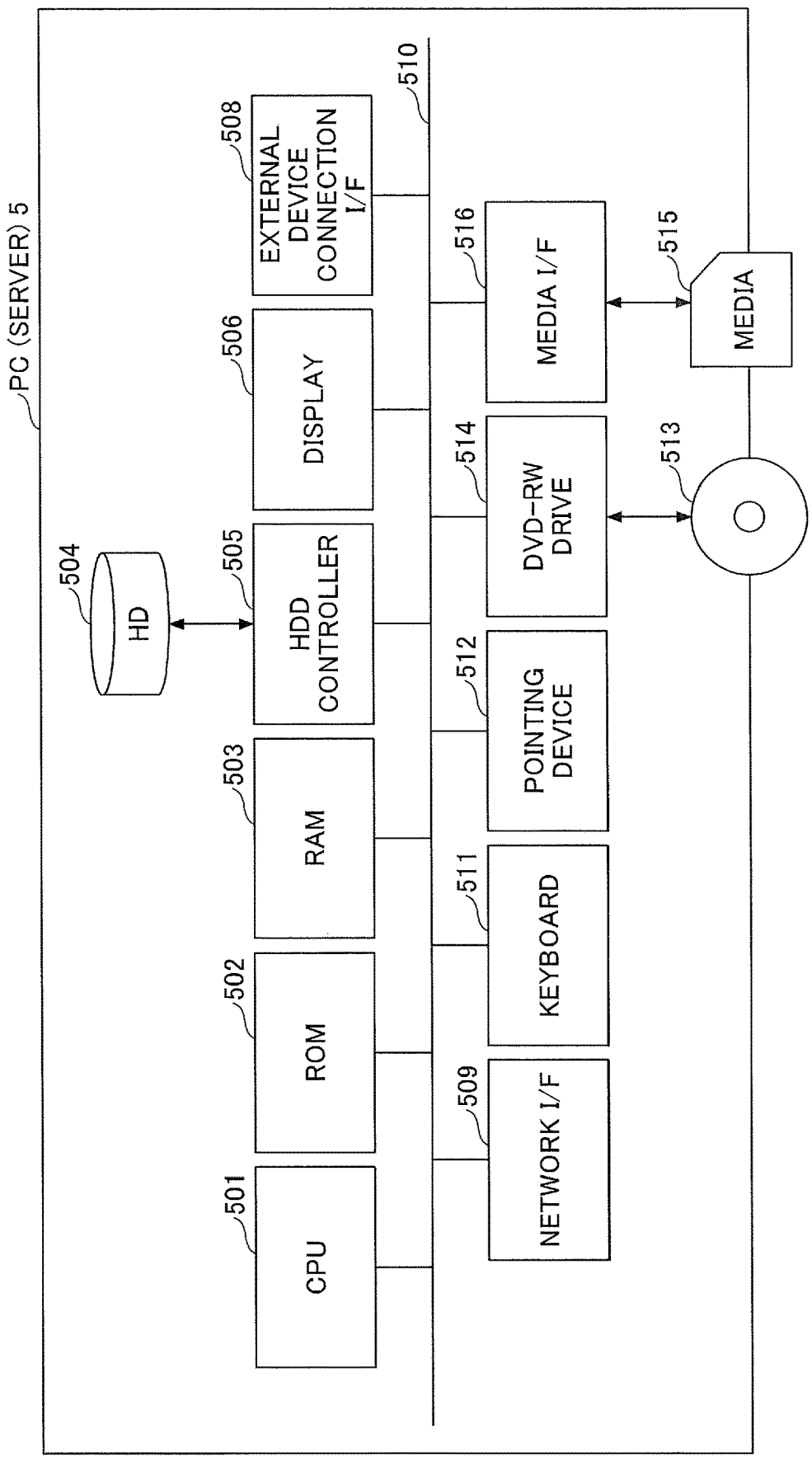
FIG. 7 is a diagram illustrating a hardware configuration of a PC (server).

For example, the information processing apparatus 1 according to the embodiment may be a PC (server) 5 having a hardware configuration as illustrated in FIG. 7.

FIG. 7 is a diagram illustrating a hardware configuration of a PC (server) 5. Here, the hardware configuration of the server 5 will be described.

As illustrated in FIG. 7, the server 5 is built as a computer that includes a CPU 501, a ROM 502, a RAM 503, an HD 504, an HDD (hard disk drive) controller 505, a display 506, an external device connection I/F (Interface) 508, a network I/F 509, a data bus 510, a keyboard 511, a pointing device 512, a DVD-RW (Digital Versatile Disk Rewritable) drive 514, and a media I/F 516.

Among these, the CPU 501 controls operations of the entire server 5. The ROM 502 stores a program used for driving the CPU 501, such as an IPL. The RAM 503 is used as the work area of the CPU 501. The HD 504 stores various items of data such as a program. The HDD controller 505 controls reading or writing of various items of data on the HD 504 under control of the CPU 501. The display 506 displays various items of information such as cursors, menus, windows, characters, images, and the like. The external device connection I/F 508 is an interface for connecting various external devices. In this case, the external devices is, for example, a USB (Universal Serial Bus) memory, a printer, or the like. The network I/F 509 is an interface for performing data communication using a communication network 100. The bus line 510 is an address bus, a data bus, and the like for electrically connecting components including the CPU 501 and the like illustrated in FIG. 5 to each other.

Also, the keyboard 511 is a type of input device having multiple keys for inputting characters, numbers, various commands, and the like. The pointing device 512 is a type of input device for selecting and executing various commands, selecting an object to be processed, moving a cursor, and the like. The DVD-RW drive 514 controls reading and writing of various items of data on the DVD-RW 513 as an example of an attachable/detachable recording medium. Note that the medium is not limited to a DVD-RW, and may be a DVD-R or the like. The media I/F 516 controls reading and writing (storage) of data on a recording medium 515 such as a flash memory.

As above, embodiments have been described with reference to specific examples. However, however, the present disclosure is not limited to these specific examples. Design changes appropriately added to these specific examples by those skilled in the art are also contained within the range of the present disclosure as long as the features in the present disclosure are provided. The elements, arrangements, conditions, shapes, and the like of the respective specific examples described above are not limited those as exemplified, and can be modified appropriately. The elements of the respective specific examples described above may be combined differently as appropriate, as long as no technical inconsistency is introduced.

In the above embodiment, a configuration is exemplified in which an icon is set to be displayed or be hidden depending on the state of availability of the corresponding application, and in response to this setting, the home screen display processing unit 203 dynamically changes whether to display or hide each page of the home screen; however, the configuration is not limited as such. The configuration simply needs to be capable of at least setting a page having no icon to be displayed to be hidden, or, for example, to be capable of setting a blank page having no icon to be arranged to be hidden.

What is claimed is:
1. An information processing apparatus comprising:
a memory; and
a processor configured to execute
a hiding process of hiding a page on which no icon is to be displayed at all, from among a plurality of pages included in a home screen on which a plurality of icons of applications installed on the information processing apparatus are arranged, and
a displaying process of displaying the home screen to which the hiding process is applied.

2. The information processing apparatus as claimed in claim 1, the processor is further configured to execute an icon-hiding process of hiding an icon of an application that is not available, based on a state or authenticated permission of the application,
wherein the hiding process hides a page on which only one or more icons to be hidden as determined by the icon-hiding process are arranged, from among the plurality of pages.

3. The information processing apparatus as claimed in claim 1, wherein when an icon is to be moved on the home screen, the hiding process displays a page that is hidden so that an icon can be arranged onto the page.

4. The information processing apparatus as claimed in claim 1, wherein in a case where there is a page on which no icon is to be displayed among the plurality of pages, the hiding process removes the page from among the plurality of pages, and reorders other pages having icons, to display the other pages.

5. The information processing apparatus as claimed in claim 1, wherein the hiding process adjusts brightness of an icon of an application that is not available due to the state and the authenticated permission of the application to be half, to display a page on which the icon is arranged.

6. A home screen display method, executed by an information processing apparatus including a memory and a processor, the method comprising:
- a hiding step of hiding a page on which no icon is to be displayed at all, from among a plurality of pages included in a home screen on which a plurality of icons of applications installed on the information processing apparatus are arranged, and
- a displaying step of displaying the home screen to which the hiding step is applied.

7. A non-transitory computer-readable recording medium having computer-readable instructions stored thereon, which when executed, causes an information processing apparatus including a memory and a processor to execute a process of a home screen display program, the process comprising:
- a hiding process of hiding a page on which no icon is to be displayed at all, from among a plurality of pages included in a home screen on which a plurality of icons of applications installed on the information processing apparatus are arranged, and
- a displaying process of displaying the home screen to which the hiding process is applied.

* * * * *